(12) United States Patent
Markowski et al.

(10) Patent No.: US 8,885,371 B2
(45) Date of Patent: Nov. 11, 2014

(54) MULTI-LEVEL PARALLEL POWER CONVERTERS

(75) Inventors: Piotr Markowski, Ansonia, CT (US); Lin Guo Wang, Nanjing (CN); Hong Fei Bu, Nanjing (CN)

(73) Assignee: Astec International Limited, Kwun Tong, Kowloon (HK)

( * ) Notice: Subject to any disclaimer, the term of this patent is extended or adjusted under 35 U.S.C. 154(b) by 696 days.

(21) Appl. No.: 13/093,415

(22) Filed: Apr. 25, 2011

(65) Prior Publication Data

US 2012/0092908 A1   Apr. 19, 2012

(30) Foreign Application Priority Data

Oct. 19, 2010   (WO) ............... PCT/CN2010/077869

(51) Int. Cl.
  *H02J 1/10*   (2006.01)
  *H01F 27/38*   (2006.01)
  *H01F 30/02*   (2006.01)
  *H02M 3/158*   (2006.01)

(52) U.S. Cl.
  CPC .......... *H02M 3/1584* (2013.01); *H01F 27/385* (2013.01); *H01F 30/02* (2013.01)
  USPC ........................................................ 363/65

(58) Field of Classification Search
  CPC .......................... H02M 3/1584; H01F 27/385
  USPC .................... 363/65, 67, 69, 70, 71
  See application file for complete search history.

(56) References Cited

U.S. PATENT DOCUMENTS

| | | | |
|---|---|---|---|
| 6,169,676 B1 | 1/2001 | Dahler et al. | |
| 6,867,987 B2 | 3/2005 | Cheng et al. | |
| 6,873,237 B2 | 3/2005 | Chandrasekaran et al. | |
| 7,449,799 B2 | 11/2008 | Levin et al. | |
| 7,489,225 B2 | 2/2009 | Dadafshar | |
| 7,609,536 B2 * | 10/2009 | Brochu et al. | 363/69 |
| 7,724,549 B2 | 5/2010 | Skibinski et al. | |
| 7,826,235 B2 * | 11/2010 | Hatanaka | 363/17 |
| 7,830,236 B2 | 11/2010 | Raiser et al. | |

FOREIGN PATENT DOCUMENTS

| | | |
|---|---|---|
| DE | 10018668 | 10/2001 |
| DE | 102007010819 | 9/2008 |

* cited by examiner

*Primary Examiner* — Matthew Nguyen
(74) *Attorney, Agent, or Firm* — Harness, Dickey & Pierce, P.L.C.

(57) ABSTRACT

Multi-level power converters are disclosed. In one embodiment, a multi-level power converter includes an input for receiving an input voltage and a converter output for providing a variable output voltage. The multi-level power converter includes a plurality of switching circuits. Each switching circuit is connected to the input in parallel with each other switching circuit. Each switching circuit includes an output. Each switching circuit is selectively operable to couple its output to the input voltage or a reference voltage. The multi-level power converter includes a parallel multi-winding autotransformer (PMA). The PMA includes a plurality of windings and a magnetic core having a plurality of magnetically connected columns. Each winding is positioned around a different one of the columns and has a beginning and an end. The output of each switching circuit is coupled to the beginning of a different winding. The end of each winding is connected to the converter output in parallel with each other winding.

21 Claims, 13 Drawing Sheets

MULTI-LEVEL PARALLEL POWER CONVERTERS

CROSS-REFERENCE TO RELATED APPLICATION

This application claims the benefit and priority of International Application No. PCT/CN2010/077869, filed Oct. 19, 2010.

FIELD

The present disclosure relates to multi-level parallel power converters.

BACKGROUND

This section provides background information related to the present disclosure which is not necessarily prior art.

Switching converters are commonly used in the field of power conversion for many reasons, including their high efficiency and compact size. The fundamental mechanism of switching power conversion is based on the principle of binary regulation of the power flow (i.e., on and off), commonly supplemented with passive filtering using inductors and capacitors. The energy storage of capacitors and inductors allows power flow to be maintained to the output when power flow from the input is switched off. By varying the relative ratio of on and off periods, the rate of the flow of energy and associated parameters like voltage and current can be regulated. When switching frequency is sufficiently higher than the regulation bandwidth for a particular application, accurate and consistent flow of the power can be achieved (e.g., free of noise and ripple caused by discontinuous operation of the power switches). These methods, often called Pulse Width Regulation and Switching Mode Regulation, are well known in the art.

Higher switching frequencies in switching converters typically provide several advantages. For example, the required size of the output filter is reduced, the amplitude of undesired variable components of the output voltage (e.g., voltage ripple) is reduced and regulation bandwidth can be increased. However, the process of switching the flow of power in a switching converter is a source of additional power losses, commonly referred to as switching losses. Accordingly, increasing the frequency of switching increases the number of switching transitions that occur and increases the total switching losses over a given time period. As a result, switching converters are typically designed to balance the advantages provided by increased switching frequency with the burden of reduced efficiency due to extra switching losses.

There are numerous applications that benefit from (or require) high regulation bandwidth in comparison with practically achievable switching frequency for a particular type of power transistor. An example of such application is a high power, high frequency inverter used in electric motor drives. In such an application, producing an appropriately filtered sinusoidal output voltage from an on/off input sequence may require a relatively high switching frequency that generally results in poor efficiency. This situation is particularly common in applications with high voltage levels, as appropriately rated components typically have slow switching characteristics and produce significant amount of energy loss with each switching transition.

Multi-level converters are sometimes used to overcome such limitations. Multi-level converters reduce the requirement for high switching frequency by producing more than two levels of discrete voltages in the process of regulation. Multi-level converters permit fast and accurate regulation with fewer transitions (i.e., with a lower switching frequency). There are numerous examples of multi-level converters. Among the common types of multi-level converters are the diode clamped, the capacitor clamped and the cascaded multi-level converters shown in FIGS. 1, 2 and 3, respectively.

These multi-level converters perform their role of reducing the need for high frequency switching transistors, but also allow processing of higher voltages than the voltage rating of the individual components of the multi-level converter. This is possible because of the multi-cell arrangement, in which overall voltage stress is divided between multiple cells forming a stack between the two input rails. Because of this ability, it is possible to construct multi-level converters capable of processing higher voltages than could otherwise be processed with components having a particular rating or to construct multi-level converters using lower rated components than would otherwise be needed for potential savings in cost, size and efficiency.

The output current of common multi-level converters passes through a relatively large number of semiconductors in the process of power conversion. This results in larger conduction losses than if the output current passed through fewer semiconductors (as occurs in some other types of power converters). The relative importance of these losses increases in lower voltage, higher current applications. Larger conduction losses can, in some instances, offset or cancel the advantages from lower switching frequency, thus reducing the usefulness of multi-level converters.

SUMMARY

This section provides a general summary of the disclosure, and is not a comprehensive disclosure of its full scope or all of its features.

According to one aspect of this disclosure, a multi-level power converter includes an input for receiving an input voltage and a converter output for providing a variable output voltage. The multi-level power supply includes a plurality of switching circuits. Each switching circuit is connected to the input in parallel with each other switching circuit. Each switching circuit includes an output. Each switching circuit is selectively operable to couple its output to the input voltage or a reference voltage. The multi-level power supply includes a parallel multi-winding autotransformer (PMA). The PMA includes a plurality of windings and a magnetic core having a plurality of magnetically connected columns. Each winding is positioned about a different one of the columns and has a beginning and an end. The output of each switching circuit is coupled to the beginning of a different winding. The end of each winding is connected to the converter output in parallel with each other winding.

According to another aspect of the present disclosure, a multi-level power converter includes an input for receiving an input voltage and a converter output for providing a variable output voltage. The input includes a first input node and a second input node. The multi-level power supply includes a parallel magnetic component including a magnetic core, a first winding, a second winding, and a third winding. The magnetic core includes a first column, a second column and a third column. The first, second and third columns are magnetically connected to each other. The first winding is positioned around the first column, the second winding is positioned around the second column, and the third winding is positioned around the third column. Each of the first, second, and third windings includes an input end and an output end. The first, second, and third windings are, wound in a same direction with respect to their input ends. The output ends of the first, second, and third windings are galvanically connected to each other and to the converter output. The multi-level power converter includes a first switching circuit coupled to the first input node, the second input node and the input end of the first winding. The multi-level power supply includes a second switching circuit coupled to the first input node, the second input node and the input end of the second winding. The multi-level power supply includes a third switching circuit coupled to the first input node, the second input node and the input end of the third winding.

Some example embodiments of power converters incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
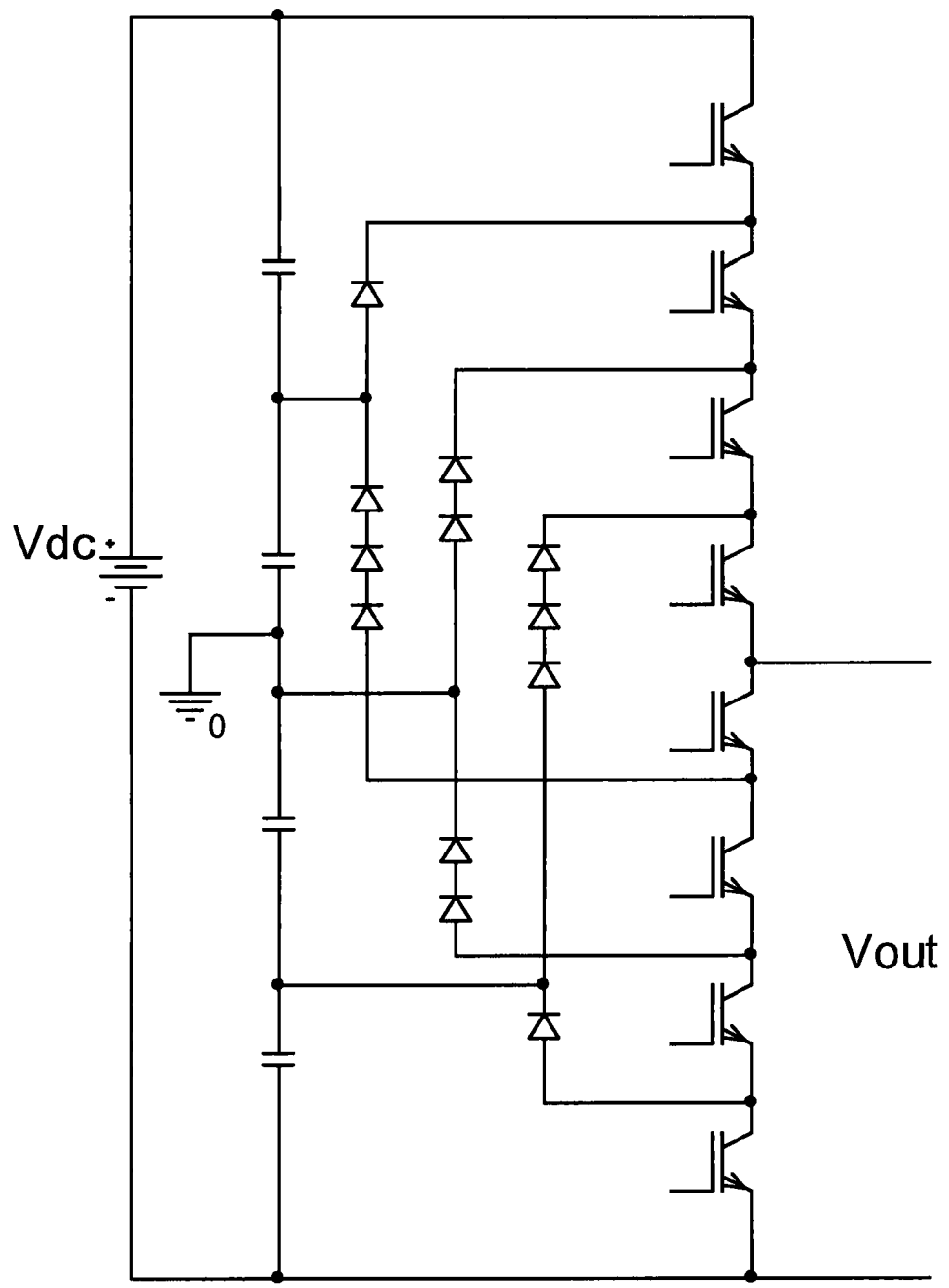
FIG. 1 is a circuit diagram of a prior art, five level, diode clamped, multi-level power converter.
Figure 2:
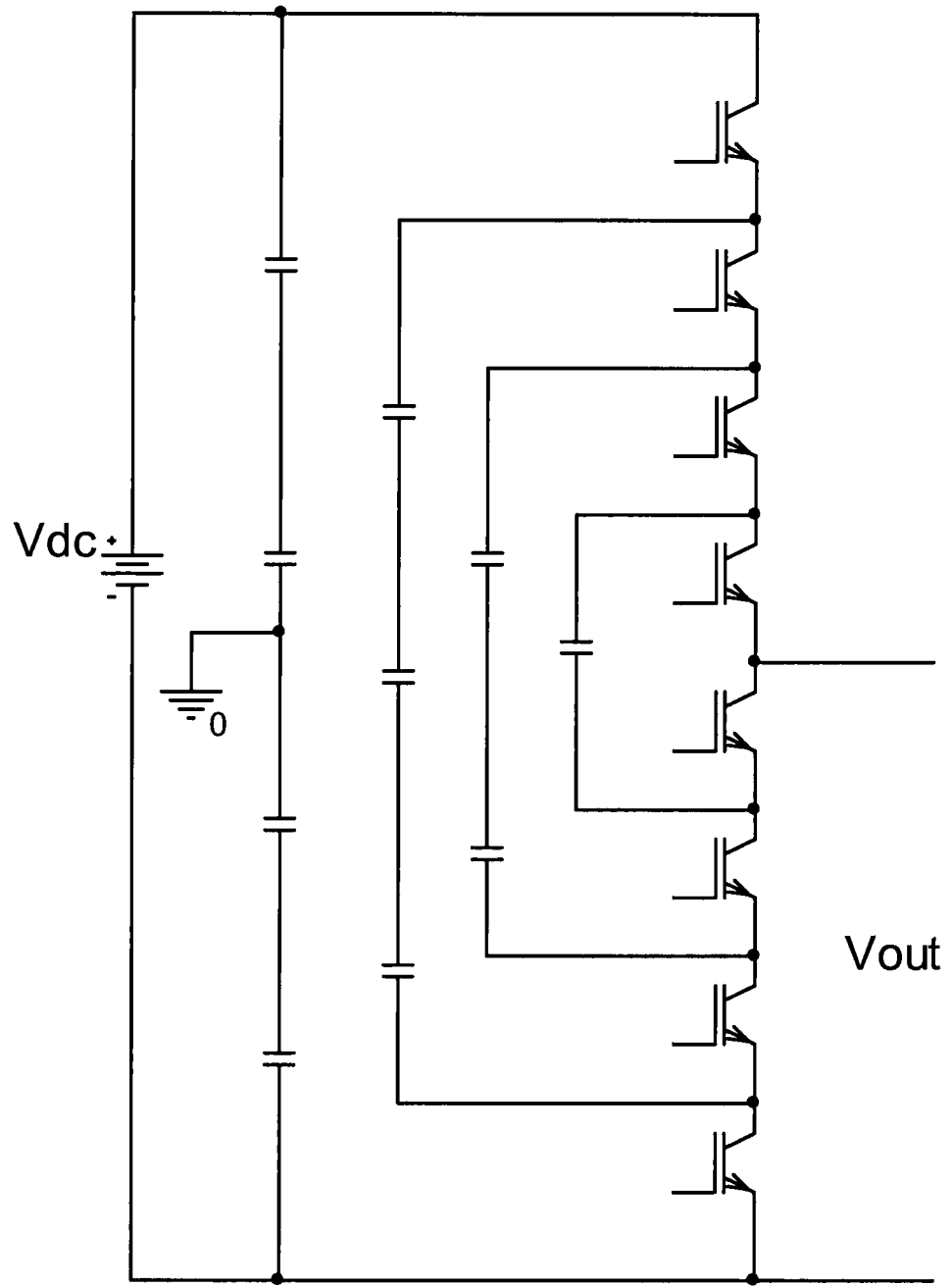
FIG. 2 is a circuit diagram of a prior art, five level, capacitor clamped, multi-level power converter.
Figure 3:
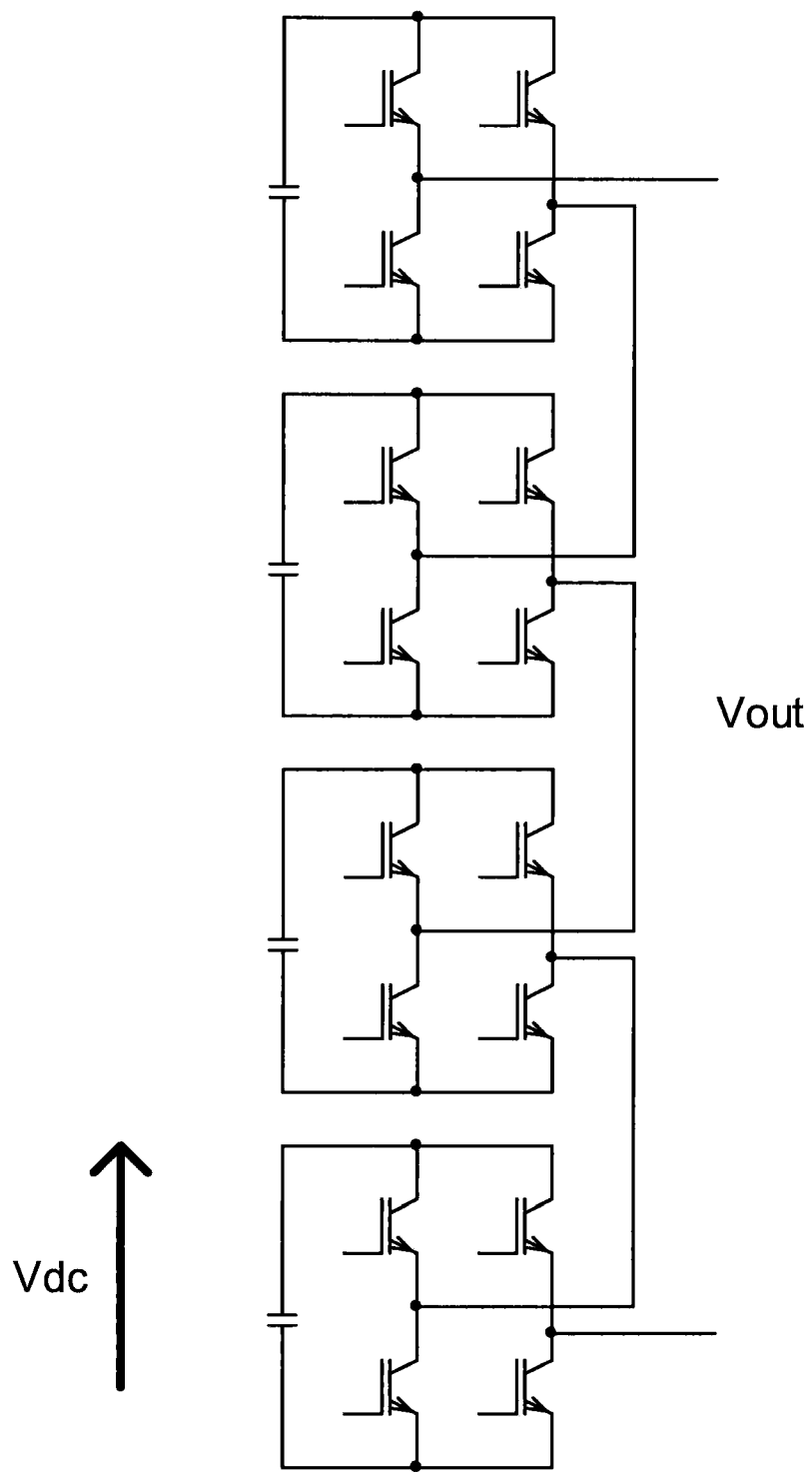
FIG. 3 is a circuit diagram of a prior art, cascaded multi-level power converter.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Various embodiments of the present disclosure teach multi-level converters that may achieve the advantages of multi-level conversion while avoiding some of the higher losses of other multi-level converters arising from serial arrangement of power transistors.

As disclosed herein, a Multi-level Parallel Converter (MPC) is a type of multi-level switching converter based on cells operating in semi-parallel fashion and combined via a passive matching network. The output voltage of an MPC may be regulated by changing between one of many available discrete voltage levels. This permits an output voltage to be produced with a low harmonic content while keeping switching frequency relatively low.

The need for passive filtering is reduced in an MPC over other power converters, which may improve efficiency, decrease size, decrease cost and increase bandwidth over other designs. The output voltage of the MPC can assume n+1 discrete voltage levels from approximately zero to the level approximately equal to the input voltage, where n is the number of switching circuits (sometimes referred to as switching cells). Voltage levels between the discrete values can be obtained by periodically oscillating between available levels with varying duty cycles and using appropriate filtering as in standard PWM technology.

The output current of the MPC is distributed among multiple switching circuits, thereby reducing current density. This reduces losses, component stress and allows use of smaller and faster switching components. In some embodiments, currents in the individual switching circuits are forced to approximately track each other by an appropriately structured magnetic component.

Figure 4:
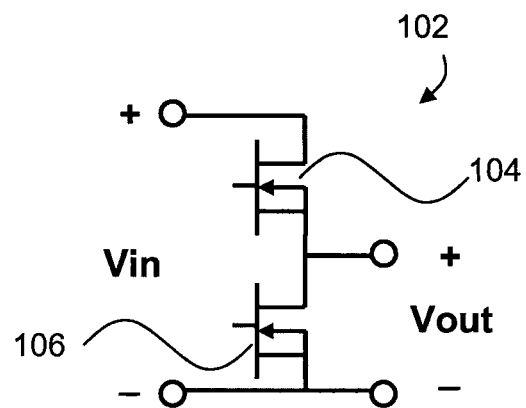
FIG. 4 is an example switching circuit for a multi-level parallel converter according to the present disclosure.

An MPC includes a plurality of switching circuits capable of providing a switched voltage. One example switching circuit, generally indicated by the reference number 102, for an MPC is illustrated in FIG. 4. The switching circuit 102 includes two stacked switches 104, 106. The switches 104, 106 may be any suitable type of switch, including, for example, BJTs (n-type and/or p-type), IGBTs, MOSFETs, etc. In some embodiments, one of the switches 104, 106 may be replaced by a diode or diode connected transistor. In some embodiments, the switching circuit 102 may include one or more switches arranged in a different configuration than the switches 104, 106.

Figure 4A:
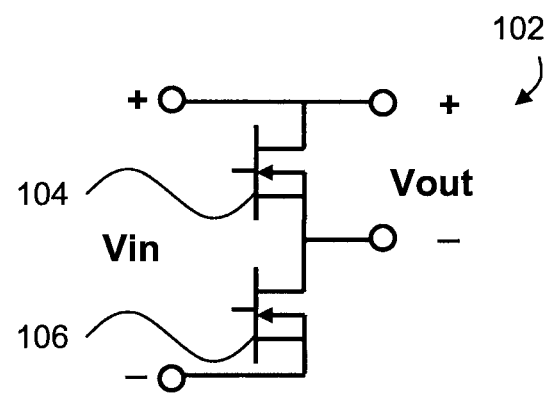
FIG. 4A is the example switching circuit of FIG. 4 with a different input and output connection configuration.

When the upper switch 104 is on (i.e., energized, conductive, etc.) and lower switch 106 is off (i.e., not energized, blocking), the output voltage of the switching circuit 102 is approximately equal to the input voltage. When switch 106 is on and switch 104 is off, the output voltage of the switching circuit is approximately equal to zero. The voltage drop across the finite impedance of switches 104, 106 during the time they are on has negligible effect on an MPC in which the switching circuit 102 is included from the perspective of the principle operation of the MPC and will generally be disregarded in the subsequent explanations. In some embodiments, the connection of the switches 104, 106 to the output voltage may be reversed as illustrated, for example, in FIG. 4A. In such embodiments, when the lower switch 106 is on (i.e., energized, conductive, etc.) and upper switch 104 is off (i.e., not energized, blocking), the output voltage of the switching circuit 102 is approximately equal to the input voltage and when switch 104 is on and switch 106 is off, the output voltage of the switching circuit is approximately equal to zero.

An MPC is created by combining a plurality of switching circuits (such as switching circuit 102). The larger the number of switching circuits used, the more accurate voltage regulation can be achieved with limited (or no) passive filtering.

Figure 5:
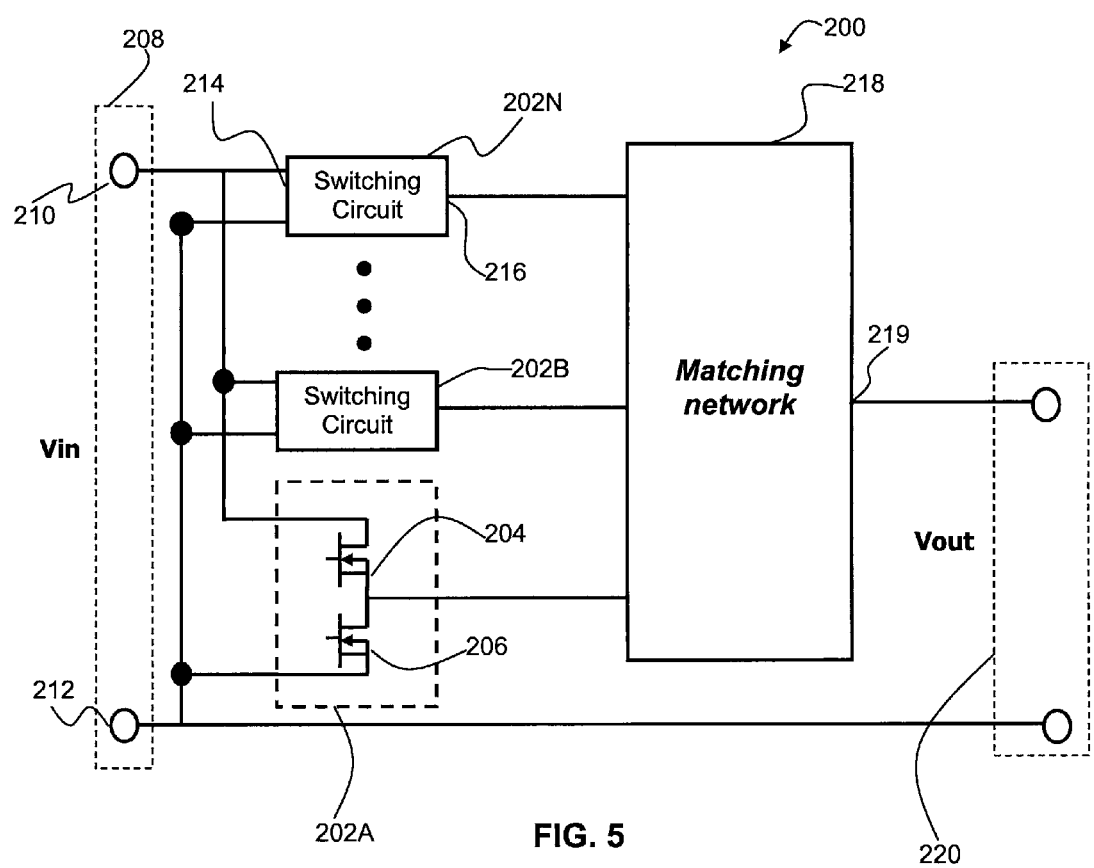
FIG. 5 is a simplified circuit diagram of an example multi-level parallel converter including a plurality of switching circuits coupled to an output via a matching network.

FIG. 5 illustrates an example MPC 200. The MPC 200 includes an input 208 for receiving an input voltage $V_{in}$. The input 208 includes a first input node 210 and a second input node 212. The MPC 200 includes n switching circuits 202A-N, where n is a positive integer greater than two. Each switching circuit 202 has an input 214 and an output 216. The input 214 of each switching circuit 202 is connected to the first input node 210 and the second input node 212. Thus, each switching circuit 202 separately receives at its input 214, the input voltage $V_{in}$ applied to the input 208. In this example, each switching circuit includes two switches 204, 206 (which, for clarity, are only illustrated in switching circuit 202A).

The switches 204, 206 of each switching circuit 202 are configured such that the switching circuits' outputs 216 may be selectively coupled to either the first node 210 or the second node 212. For each switching circuit 202, when its switch 204 is on and the switch 206 is off, the switching circuit outputs the input voltage $V_{in}$ of the MPC 200. When a switching circuit 202 has its switch 206 on and its switch 204 off, it outputs the reference voltage at the second input node 212 (e.g., ground, about zero volts, etc.).

The outputs of the switching circuits 202A-N are combined by a matching network 218. The matching network 218 is a passive matching network that may average the discrete voltages from all switching circuits 202. The combined output 219 is coupled to an output 220 of the MPC 200, to provide an output voltage $V_{out}$. In some embodiments, the matching network 218 produces an equally weighted average of the outputs of the switching circuits 202. In other embodiments, the output of one or more switching circuit(s) 202 may be weighted differently from the output of one or more other switching circuit(s) 202. The switching frequency of the switching circuits 202 may be the same or may differ from one or more other switching circuit(s) 202. One or more of the switching circuits 202 may be coupled to a different input voltage than one or more other switching circuits 202. The matching network 218 may also be configured to perform the role of filtering the output voltage $V_{out}$ by using an appropriate network of inductors, capacitors and/or resistors.

Figure 6:
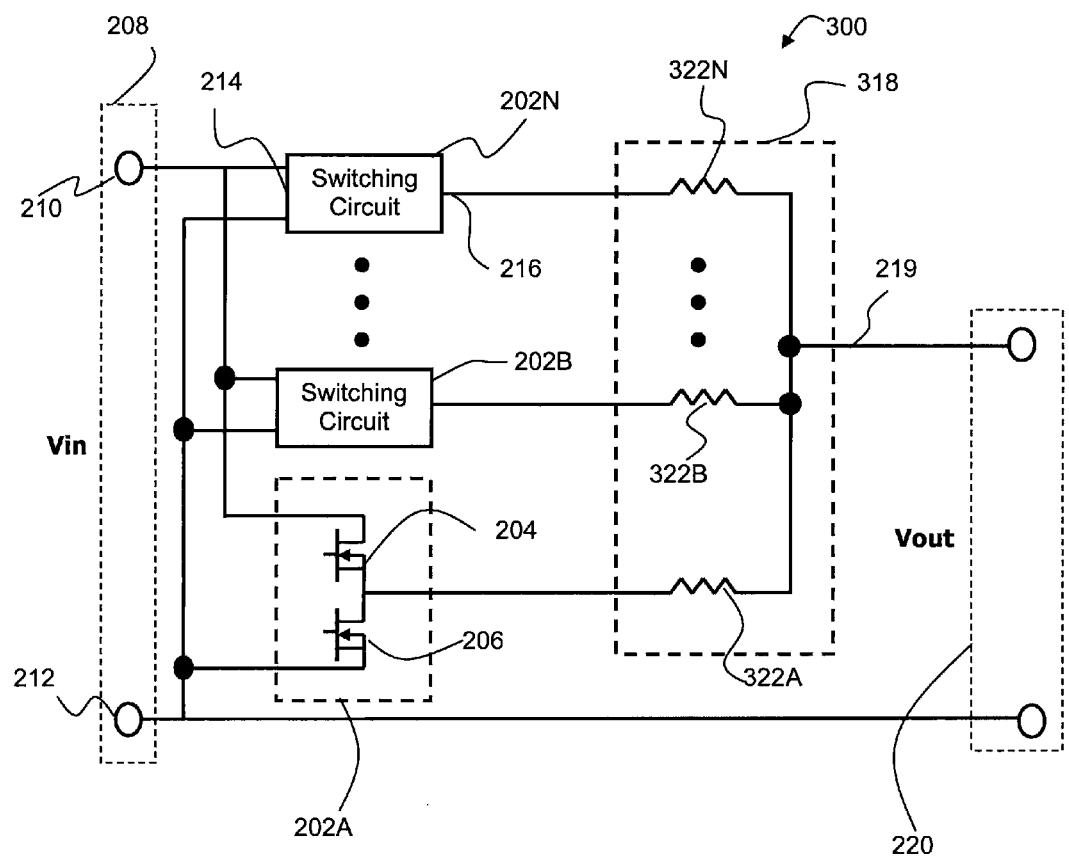
FIG. 6 is a simplified circuit diagram of an example multi-level parallel converter including a plurality of switching circuits coupled to an output via a resistor based matching network.

An example MPC 300 similar to the MPC 200 of FIG. 5, but with an example resistor based matching network 318, is illustrated in FIG. 6.

The outputs of the switching circuits 202A-N are combined by a matching network 318. In the example embodiment of FIG. 6, the matching network 318 is a star-connected set of resistors 322A-322N. The output voltage $V_{out}$ will be equal, at a given time, to the average of the outputs of all switching circuits 202. Because each switching circuit 202 can provide an output voltage approximately equal to the input voltage $V_{in}$ or approximately equal to zero volts, $V_{out}$ can generally assume n+1 discrete voltage levels based on the number of switching circuits 202 having an output equal to $V_{in}$ versus the total number of switching circuits 202. If, for example, n=3 and the resistors 322 are substantially identical, the output voltage $V_{out}$ can assume four discrete voltage levels. If none of the switching circuits 202 is outputting the input voltage $V_{in}$, the output voltage $V_{out}$ will be the reference voltage at the second input node 212 (e.g., zero volts). If any one of the switching circuits 202 is outputting the input voltage $V_{in}$, the output voltage $V_{out}$ will be about one-third of the input voltage $V_{in}$. If any two of the switching circuits 202 are outputting the input voltage $V_{in}$, the output voltage $V_{out}$ will be about two-thirds of the input voltage $V_{in}$. If all three switching circuits 202 are outputting the input voltage $V_{in}$, the output voltage $V_{out}$ will be approximately equal to the input voltage $V_{in}$. Of course, the output voltage $V_{out}$ will not be exactly one-third of input voltage $V_{in}$, two-thirds of input voltage $V_{in}$, or the input voltage $V_{in}$, because of losses in the components of the MPC 300, including the voltage drop across the resistors 322, etc.

The levels that the output voltage $V_{out}$ may assume can be varied in several ways. For example, the number of switching circuits 202 in the MPC 300 can be varied to change the number of discrete levels. Further, as discussed above, the switching circuits 202 may be pulsed on and off with varying duty cycles to achieve an output voltage $V_{out}$ between the discrete levels. One or more of the switching circuits 202 may be coupled to a different input voltage than one or more other switching circuits 202. Further still, the values of one or more of the resistors 322 may be different from one or more others of the resistors 322 to provide weighted averaging. In an embodiment with non-identical resistors, the output voltage $V_{out}$ depends not only on how many of the switching circuits 202 are outputting the input voltage $V_{in}$, but also on which particular switching circuit 202, or combination of switching circuits 202, are outputting the input voltage $V_{in}$.

The switching frequency of the switching circuits 202 may be the same or may differ from one or more other switching circuit(s) 202. In another embodiment, one or more non-switching circuits (not illustrated in the example MPC 300) may also be coupled to the switching circuits 202 via the matching network 318. The matching network 318 may also be configured to perform the role of output voltage filtering by using an appropriate network of inductors, capacitors and/or resistors.

Further, if the resistors 322 are replaced with inductors, the matching network 318 will preserve its multi-level and averaging capabilities, but losses in the matching network 318 may be reduced (although not eliminated) and load regulation may be improved.

Figure 7:
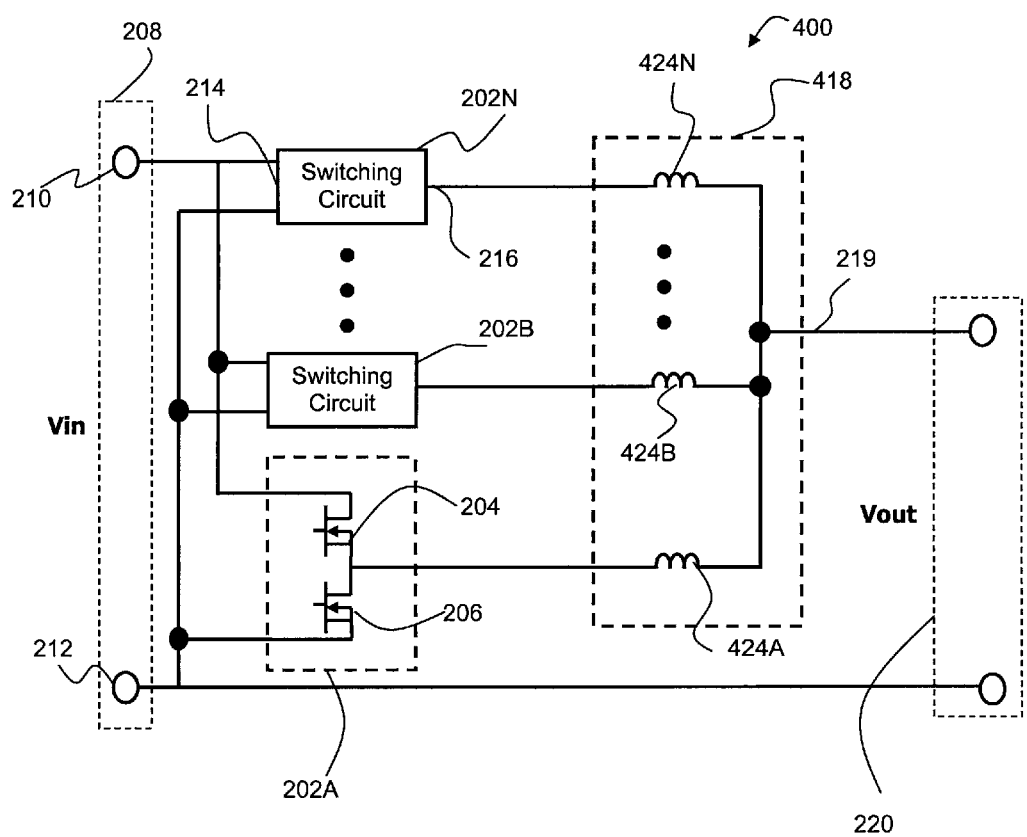
FIG. 7 is a simplified circuit diagram of an example multi-level parallel converter including a plurality of switching circuits coupled to an output via an inductor based matching network.

Another example MPC 400, similar to the MPC 200 of FIG. 5 and the MPC 300 of FIG. 6, but including an example inductor-based matching network 418, is illustrated in FIG. 7.

In this example embodiment, the outputs of the switching circuits 202A-N are combined by the matching network 418 using a star-connected set of inductors 424A-424N. The output voltage $V_{out}$ will be equal, at a given time, to the average of the outputs of all switching circuits 202. Because each switching circuit 202 can provide an output voltage equal to the input voltage $V_1$, or approximately equal to zero volts, $V_{out}$ can generally assume n+1 discrete voltage levels based on the number of switching circuits 202 having an output equal to $V_{in}$ versus the total number of switching circuits 202.

As noted above, the levels that the output voltage $V_{out}$ may assume can be varied in several ways. For example, the number of switching circuits 202 in the MPC 400 can be varied to change the number of discrete levels. Further, the switching circuits 202 may be pulsed on and off with varying duty cycles to achieve an output voltage $V_{out}$ between the discrete levels. Further still, the values of one or more of the inductors 424 may be different from one or more others of the inductors 424 to provide weighted averaging. In an embodiment with non-identical inductors 424, the output voltage $V_{out}$ depends not only on how many of the switching circuits 202 are outputting the input voltage $V_{in}$, but also on which particular switching circuit 202, or combination of switching circuits 202, are outputting the input voltage $V_{in}$.

The switching frequency of the switching circuits 202 may be the same or may differ from one or more other switching circuits 202. In some embodiments, one or more of the switching circuits 202 may be coupled to a different input voltage than one or more other switching circuits 202. The matching network 418 may also be configured to perform the role of output voltage filtering by using an appropriate network of inductors, capacitors and/or resistors.

Each inductor 424 is continuously exposed to a voltage difference between the output 216 of its respective switching circuit 202 and the output voltage $V_{out}$. As a result, a magnetizing current through each inductor 424 proportional to the applied volt-seconds and reversely proportional to the inductance will develop. Any appropriate control mechanism(s) (including, for example, current sharing methods for parallel converters) may be used to maintain an approximately equal amount of volt-seconds applied to each inductor 424 to avoid a build-up of this magnetizing current (and to avoid the associated component stress and power losses). Generally, the switching circuits 202 may be alternated in their on/off state to equalize the volt-seconds and current through each switching circuit 202. Some appropriate control methods may be found, for example, in U.S. application Ser. No. 12/763,629 filed Apr. 20, 2010, and U.S. application Ser. No. 12/566,892 filed Sep. 25, 2009, the entire disclosures of which are incorporated herein by reference.

The inductor based matching network 418 will not only average the voltage from multiple switching circuits 202, but can also interact with the load attached to the output 220 to form a low pass filter. By selecting the value of the inductors 424 and/or supplementing the inductors 424 with other passive components, averaging and filtering can be performed at the same time with a single matching network 418. Alternatively, a filtering network can be coupled to the matching network 418.

Other types of impedance may be used in the matching network 418 instead of (or in addition to) the inductors 424. The averaging operation of the star-connected matching network 418 may be preserved as long as the impedance is the same in all branches (for the case when equally weighted averaging is desired). Resistive components of impedances will increase conduction losses and capacitive components of impedances will increase switching losses of the switching circuit 202 and may increase noise.

The example matching network 418 requires significant amount of energy storage in the inductors 424. The inductance of the inductors 424 may limit the dynamics of the MPC 400 and, as a result, the inductance of the inductors 424 may need to be kept relatively low, which makes the magnetizing current large. This magnetizing current circulates in the inductors 424, and other components of the MPC 400, increasing component stress and losses.

Thus, the inductive-based matching network 418 composed of individual inductors 424 may be replaced with another magnetic structure.

Figure 8:
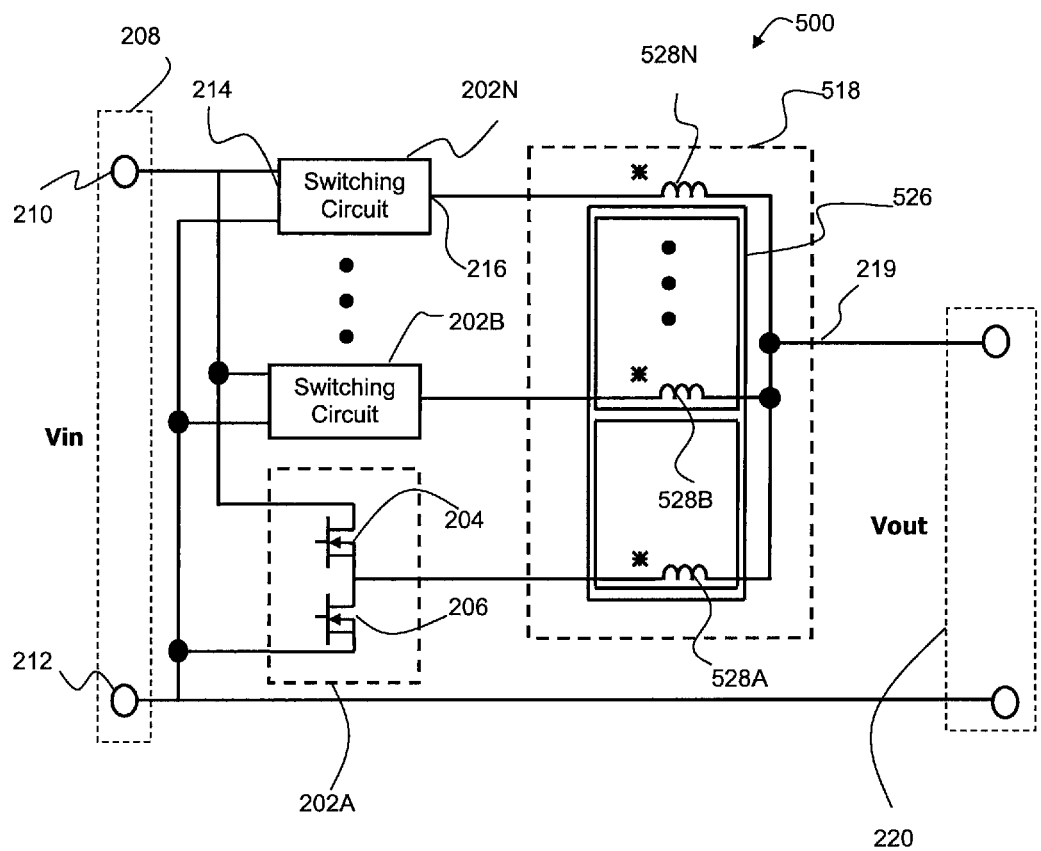
FIG. 8 is a simplified circuit diagram of an example multi-level parallel converter including a plurality of switching circuits coupled to an output via a parallel multi-winding autotransformer.

FIG. 8 illustrates an example MPC 500, similar to the MPCs 200, 300 and 400 FIGS. 5-7, but including an example matching network 518 that includes a parallel multi-winding autotransformer (PMA) 526.

The outputs of the switching circuits 202A-N are combined by a matching network 518. The output voltage $V_{out}$ will be equal, at a given time, to the average of the outputs of all switching circuits 202. Because each switching circuit 202 can provide an output voltage equal to the input voltage $V_{in}$ or approximately equal to zero volts, $V_{out}$ can generally assume n+1 discrete voltage levels based on the number of switching circuits 202 having an output equal to $V_{in}$ versus the total number of switching circuits 202.

Figure 14:
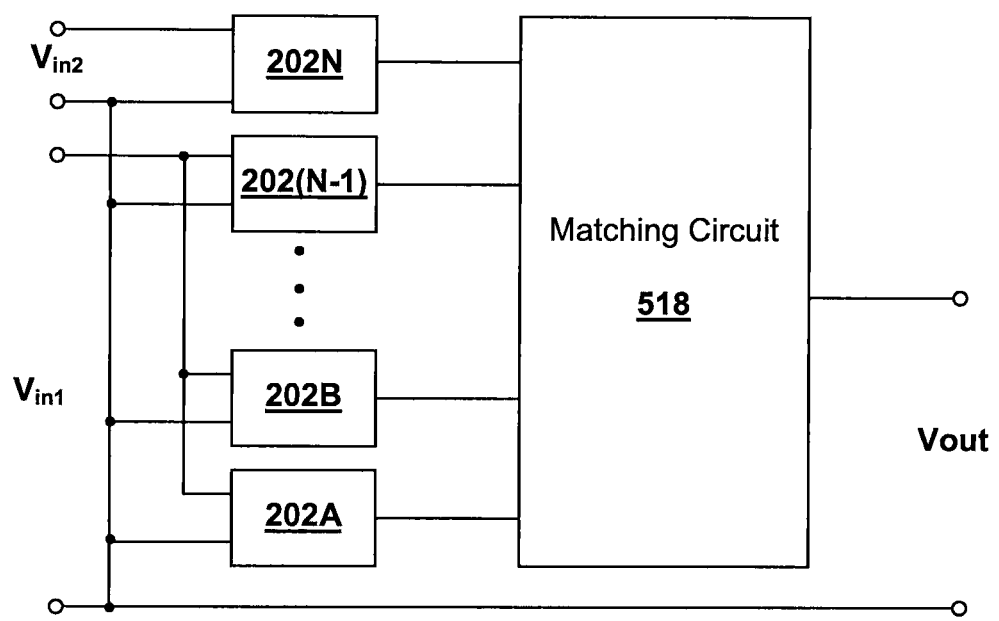
FIG. 14 is a diagram of an example multi-level power converter having a plurality of switching circuits including one switching circuit coupled to a different input voltage than the other switching circuits.

As has been noted, the levels that the output voltage $V_{out}$ may assume can be varied in several ways. For example, the number of switching circuits 202 in the MPC 500 can be varied to change the number of discrete levels. Further, and as discussed above, the switching circuits 202 may be pulsed on and off with varying duty cycles to achieve an output voltage $V_{out}$ between the discrete levels. Further still, the matching network 518 may additionally (or alternatively) be configured to provide weighted averaging. In some embodiments including, for example, the embodiment illustrated in FIG. 14, one or more of the switching circuits 202 may be coupled to a different input voltage than one or more other switching circuits 202. In an embodiment with weighted averaging and/or switching circuit(s) 202 coupled to different input voltage(s), the output voltage $V_{out}$ depends not only on how many of the switching circuits 202 are conducting, but also on which particular switching circuit 202, or combination of switching circuits 202, are conducting.

The switching frequency of the switching circuits 202 may be the same or may differ from one or more other switching circuits 202. The matching network 518 may also be configured to perform the role of output voltage filtering by using an appropriate network of inductors, capacitors and/or resistors.

In the MPC 500, the matching network 518 includes a parallel multi-winding autotransformer (PMA) 526. The PMA 526 includes a plurality of windings 528A-528N. The windings 528 are all wound the same direction (i.e., they have the same polarity). The windings 528 are wound on a common core and each winding 528 is inductively coupled to at least one (and preferably more than one) other winding 528.

Figure 9:
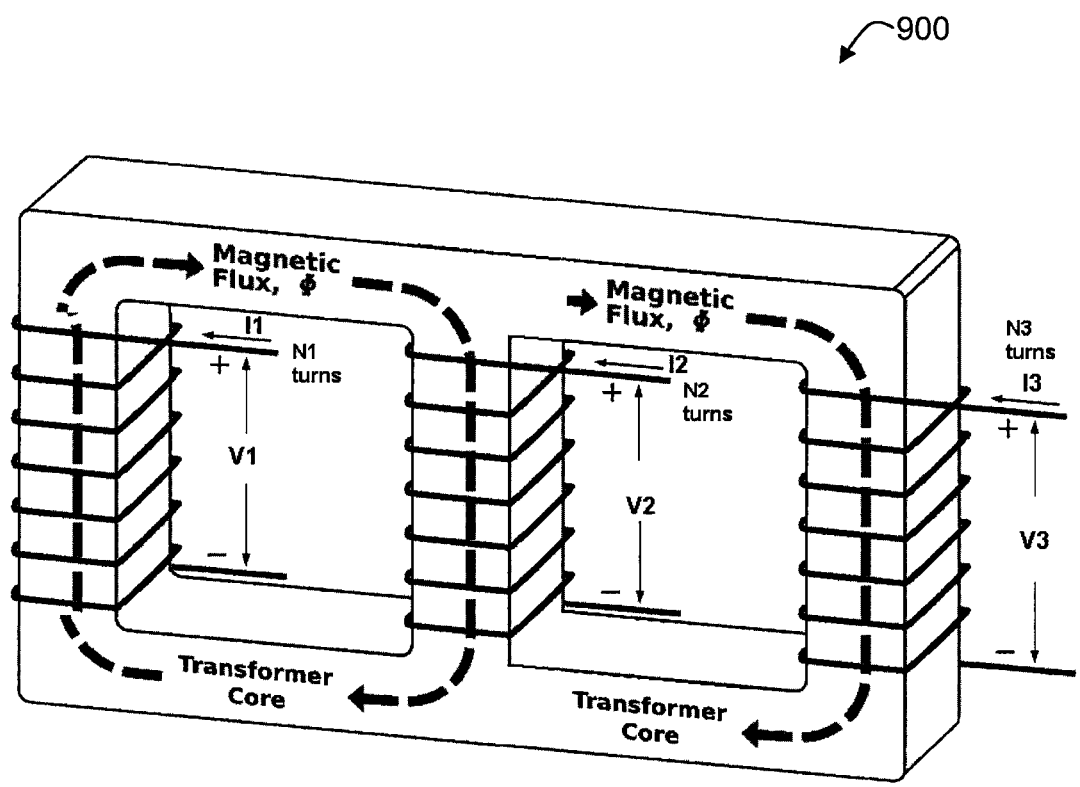
FIG. 9 is an isometric view of a prior art parallel multi-winding transformer.

The PMA 526 is a magnetic structure based on a parallel multi-winding transformer, such as the parallel multi-winding transformer 900 in FIG. 9. The parallel multi-winding transformer 900 has voltage/current/turns relationships characterized by the following equations:

$$\sum_{k=1}^{n} \frac{Vk}{Nk} = 0 \qquad (1)$$

$$I1 * N1 = I2 * N2 = \ldots = In * Nn \qquad (2)$$

In equations (1) and (2), V is a voltage applied across a winding, N is the number of turns of a winding, I is the current in a winding, and n is the number of windings.

When one end of all windings of the parallel multi-winding transformer 900 are connected at one common point, the parallel multi-winding transformer becomes a parallel multi-winding autotransformer. In a parallel multi-winding autotransformer, there is no galvanic separation between the windings and inductive coupling is used to alter voltage relationships between the inputs and the output of the parallel multi-winding autotransformer. The ends of the windings of the parallel multi-winding autotransformer are connected at one common point and, thus, no isolation is provided between the commonly connected windings. Equations (1) and (2) are valid for a parallel multi-winding autotransformer and are forced by the magnetic field.

Equation (1) describes the relationships responsible for averaging action of the PMA 526 of FIG. 8. If the number of turns for each winding 528 is the same, then:

$$\sum_{k=1}^{n} Vk = 0 \qquad (3)$$

Vk is a voltage applied across a winding 528. The voltage applied to the beginning of any winding 528 is Vin_k. The voltage applied to the end of any winding 528 is $V_{out}$. Therefore, the voltage across a winding 528 (Vk) equals Vin_k−Vout. Accordingly, equation (3) may be solved for Vout as follows:

$$\sum_{k=1}^{n} (\text{Vin\_k} - Vout) = 0 \qquad (4)$$

$$\sum_{k=1}^{n} (\text{Vin\_k}) = \sum_{k=1}^{n} Vout \qquad (5)$$

$$\sum_{k=1}^{n} (\text{Vin\_k}) = n * Vout \qquad (6)$$

$$\frac{1}{n}\sum_{k=1}^{n} (\text{Vin\_k}) = Vout \qquad (7)$$

Equation 7 confirms that a parallel multi-level autotransformer in general, and PMA 526 in particular, provides voltage averaging. For example, suppose MPC 500 has three switching circuits 202, the input voltage is $V_{in}$, and the reference voltage at the second input node 212 is zero volts, if none of the switching circuits 202 is outputting the input voltage $V_{in}$ to any winding 528, the output voltage $V_{out}$ will be zero volts. If only one of the switching circuits 202 is outputting the input voltage $V_{in}$ to a winding 528, the output voltage $V_{out}$ will be:

$$Vout = \frac{1}{3}(Vin + 0 + 0) = \frac{1}{3}Vin \qquad (8)$$

Similarly, if only two of the switching circuits 202 are outputting the input voltage $V_{in}$ to their associated windings 528, the output voltage $V_{out}$ will be:

$$Vout = \frac{1}{3}(Vin + Vin + 0) = \frac{2}{3}Vin \qquad (9)$$

Finally, if all three switching circuits 202 are outputting the input voltage $V_{in}$ to their associated windings 528, the output voltage $V_{out}$ will be:

$$Vout = \frac{1}{3}(Vin + Vin + Vin) = \frac{3}{3}Vin = Vin \qquad (10)$$

The output voltage $V_{out}$ may not be exactly one-third of input voltage $V_{in}$, two-thirds of input voltage $V_{in}$, or the input voltage $V_{in}$, because of losses in the components of the MPC 500.

While voltage averaging in the matching network 518 has been demonstrated above for a PMA 526 with windings 528 having equal turns, weighted voltage averaging may be obtained using a PMA 526 with a winding 528 (or windings 528) with a different number of turns than one or more other windings 528.

Equation (2) demonstrates the current equalizing capability of the PMA 526. In the example above where there are three windings 528, and all windings 528 have the same number of turns, equation (2) reduces to:

$$I1=I2=I3 \qquad (11)$$

Equation 11 demonstrates that the current through each winding 528 of PMA 526 will equal the current through each other winding 528. Thus, by using PMA 526 in the matching circuit 518, current through each switching circuit 202 and its associated winding 528 is forced to be equal to the current through the other switching circuits 202 and their associated windings 528.

Current equalization may be limited by a finite magnetizing inductance of each winding 528. As a result, a certain amount of imbalance of the current may persist. This residual imbalance may be considered approximately equivalent to the magnetizing current of a winding 528 imposed on top of its share of the output current. This magnetizing current, however, may be significantly smaller than the current in matching network 418 using individual inductors 424. As a result, component stress and power losses may be reduced and higher efficiency may be realized using the matching network 518 of FIG. 8.

Figure 10:
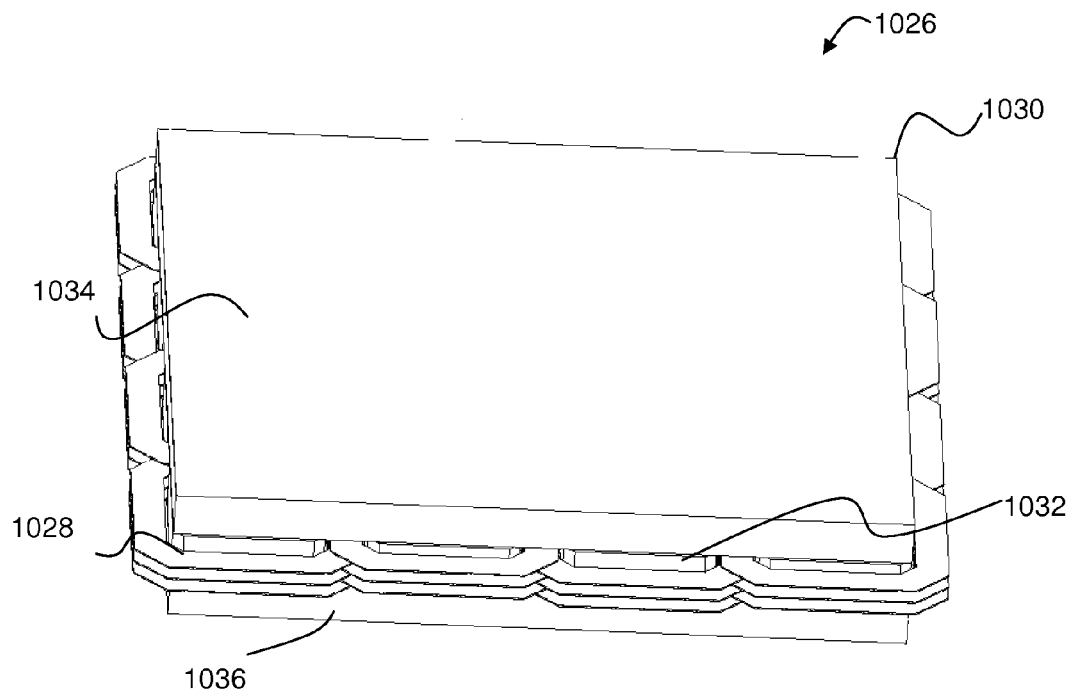
FIG. 10 is a parallel multi-winding autotransformer for use in a multi-level parallel converter according to this disclosure.
Figure 11:
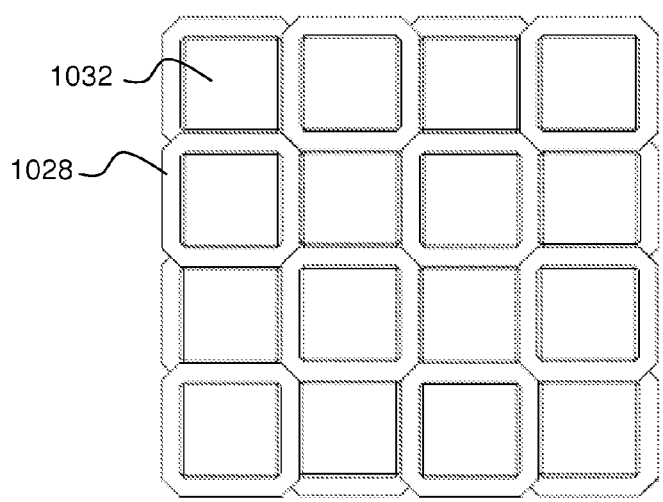
FIG. 11 is a top plan view of the autotransformer of FIG. 10 with the top of the core removed to expose the core columns and windings.

The physical arrangement of PMA 526 can be realized in many ways. The PMA 526 may resemble the parallel multi-winding transformer 900, or may have any other suitable arrangement/structure. An example parallel multi-winding autotransformer 1026 suitable for use as PMA 526 is illustrated in FIGS. 10 and 11. The autotransformer 1026 includes a magnetic core 1030 having sixteen columns 1032, a core top 1034 and a core bottom 1036. Sixteen windings 1028 are positioned around the columns 1032 (one per column). The windings 1028 are all wound the same direction (i.e., clockwise, counterclockwise, etc.). Various other parallel multi-winding magnetic structures that may be used for PMA 526 are disclosed in U.S. application Ser. No. 13/125,676, filed Apr. 22, 2011, the entire disclosure of which is incorporated herein by reference. Windings 528 may differ in size, shape, number of turns, etc. or may be the same size, shape, number of turns, etc. There may be an air gap between the adjacent windings 528 or such space may be filled with a suitable magnetic material. Windings 528 may also (or alternatively) abut each other or overlap.

Each switching circuit (e.g., 102, 202) in the multi-winding parallel converters described herein (e.g., 200, 300, 400, 500) may be identical to other switching circuits in that multi-winding parallel converter, or may be different depending on the demands of particular design. The switching circuits may be varied in terms of their input voltage, switching frequency, current rating etc. Switching circuits may themselves include multi-level converters. Switching circuits may be replaced with regulated switching converters or linear regulators.

Each switching circuit (e.g., 102, 202, 1202) and its associated portion of a matching network (e.g., 218, 318, 418, 518) in a multi-winding parallel converter described herein (e.g., 200, 300, 400, 500) may be considered a sub-converter of the multi-winding parallel converter.

Multi-winding parallel converters according to this disclosure (e.g., 200, 300, 400, 500, etc.) may be used for any power converter application. Some examples include, without limitation, applications demanding high bandwidth variable output power sources, envelope tracking power supplies for telecommunication and broadcasting, audio amplifiers, inverters (particularly for high speed drives), harmonic compensation converters, inverters for avionics (particularly 400 HZ inverters), high power inverters that require large switching power transistors with low switching frequency as compared to regulation bandwidth, etc.

Figure 12:
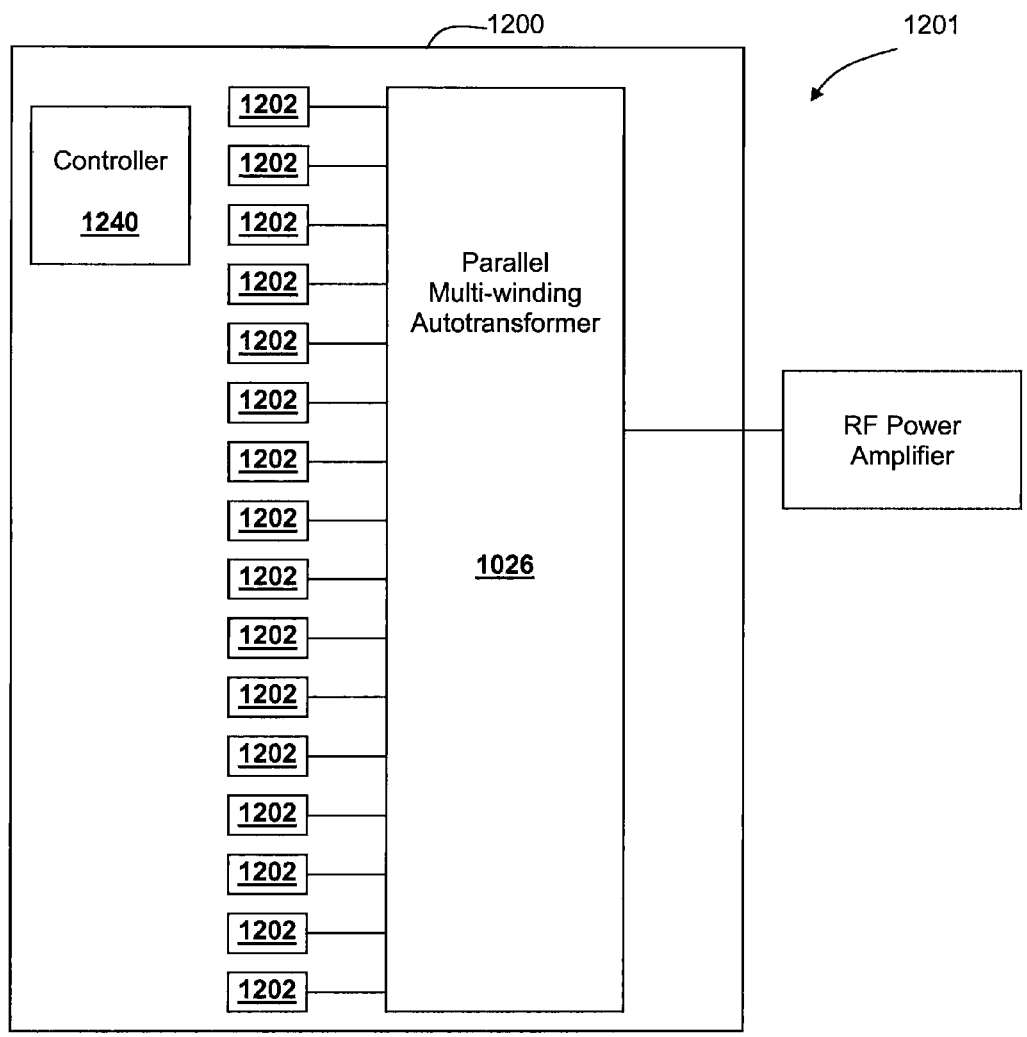
FIG. 12 is a diagram of a telecommunications system including a multi-level parallel converter according to aspects of this disclosure.

In one preferred application shown in FIG. 12, a multi-winding parallel converter 1200 according to this disclosure is used for an envelope tracking power supply for telecommunication and broadcasting system 1201. The multi-winding parallel converter 1200 includes sixteen switching circuits 1202 and the parallel multi-winding autotransformer 1026 of FIGS. 10 and 11. The output of each switching circuit 1202 is coupled to the input end of a different one of the sixteen windings 1028 (not illustrated in FIG. 12). The output ends of the sixteen windings 1028 are all coupled together and coupled to the output of the multi-winding parallel converter 1200. A controller 1240 is coupled to the switching circuits 1202 and is configured for selectively operating the switches of the switching circuits 1202 to control the output voltage of the multi-winding parallel converter 1200.

Multi-winding parallel converters according to this disclosure (e.g., 200, 300, 400, 500, 1200, etc.) may include one or more non-binary sources (i.e. sources that can output more or fewer than two states) coupled via a matching network (e.g., 218, 318, 418, 518, etc.). The non-binary sources may be instead of or in addition to one or more switching circuits (e.g., 102, 202, 1202). The non-binary source may be any other voltage source including, for example, another MPC, a linear regulator, etc.

Figure 13:
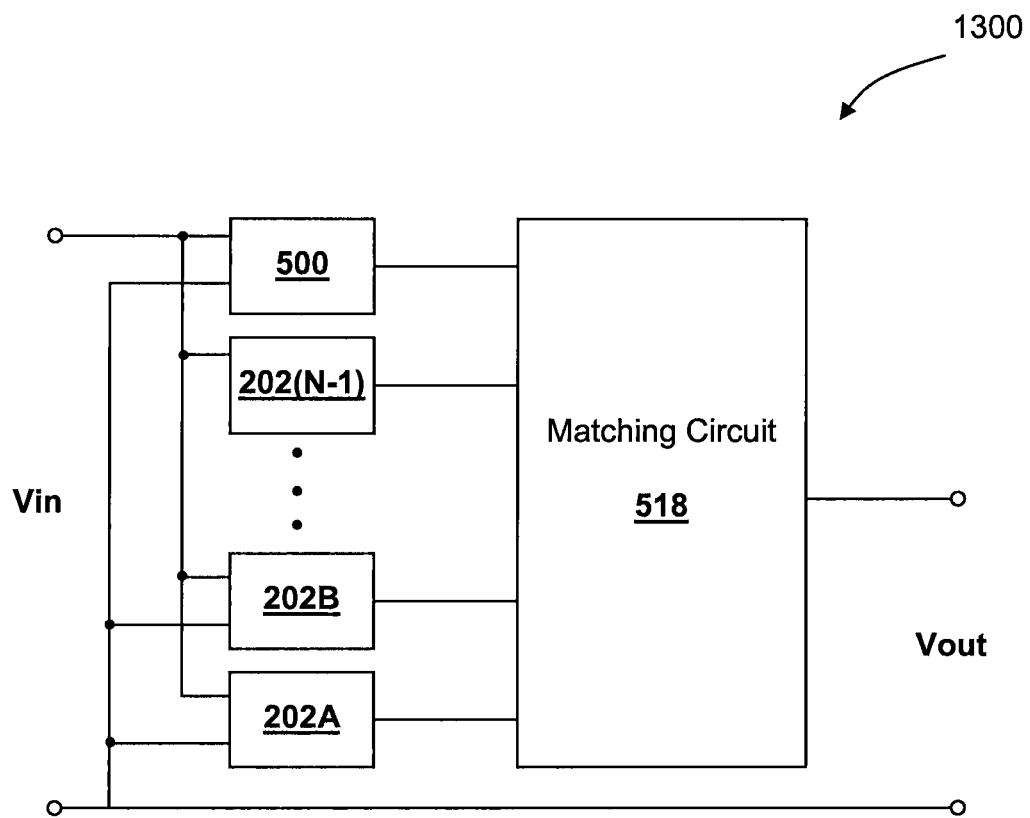
FIG. 13 is a diagram of an example multi-level power converter including the multi-level power of FIG. 8 as an input to its matching network.

An example of an MPC 1300 that includes a non-binary source in place of one switching circuit is illustrated in FIG. 13. The MPC 1300 is based on the MPC 500 of FIG. 5. Instead of having n switching circuits 202 coupled to the matching circuit 518, the MPC 1300 has n−1 switching circuits 202A-202(N-1) and another MPC 500 coupled to the matching circuit 518. The same averaging by the matching circuit 518, discussed above, applies in the MPC 1300. However, while the switching circuits 202 can output either the input voltage or about zero volts (if they are not pulsed to output a voltage between zero and the input voltage), the MPC 500 may output a plurality of discrete voltages between about zero volts and the input voltage (in the manner discussed above with respect to MPC 500). By varying the output voltage of MPC 500 to voltages between zero volts and the input voltage, the output of the matching circuit (which is the average of its inputs) can be varied in different increments than if the MPC 500 were only capable of outputting about zero volts or the input voltage.

For example, suppose n equals four, the matching circuit 518 is configured for averaging without any weighting, and the input voltage is one volt in the MPC 1300. Each switching circuit 202 that couples the input voltage to the matching circuit 518 changes the output voltage of MPC 1300 by about one-quarter of a volt (0.25V). If the MPC 500 couples the input voltage to the matching circuit 518, it also changes the output voltage in an increment of one-quarter of a volt (0.25V). If instead, the MPC 500 couples one-half of the input voltage (i.e., 0.5V) to the matching circuit 518, the MPC 500 will change the output voltage in an increment of one-eighth of a volt (0.125V). Accordingly, by varying the voltage output by the MPC 500 that is coupled to the matching circuit 518, the MPC 1300 may produce more discrete output voltages with smaller incremental differences between the discrete voltages than possible in an MPC with n switching circuits 202 and no MPC 500. As described above, various techniques (e.g., pulsing a switching circuit to output a voltage between zero and its input voltage) may be used in MPC 500 to cause it to output a number of voltage levels greater than its number of switching circuits 202 plus one, providing even more possible voltages that may be coupled to the matching circuit 518 by MPC 500. Such techniques may also be applied to the switching circuits 202 of MPC 1300 to provide even finer increments of output voltage.

The MPC 500 in MPC 1300 may be replaced with a voltage source capable of providing nearly any voltage within some range (i.e. it is not limited to a number of discrete voltage levels). For example, the MPC 500 in MPC 1300 may be replaced with a linear regulator. By providing a nearly infinite number of possible input voltages to the matching network 518 from such a variable voltage source, the output voltage of the MPC 1300 may be varied to nearly any voltage level.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-level power converter comprising:
    an input for receiving an input voltage;
    a converter output for providing a variable output voltage;
    a plurality of switching circuits, each switching circuit connected to the input in parallel with each other switching circuit, each switching circuit including an output, each switching circuit selectively operable to couple its output to the input voltage or a reference voltage; and
    a parallel multi-winding autotransformer (PMA), the PMA including a plurality of windings and a magnetic core having a plurality of magnetically connected columns, each winding positioned around a different one of the columns, each winding having a beginning and an end, the output of each switching circuit coupled to the beginning of a different winding, the end of each winding connected to the converter output in parallel with each other winding.

2. The multi-level power converter of claim 1 wherein the plurality of windings are all wound in a same direction.

3. The multi-level power converter of claim 2 wherein the plurality of windings all have a same number of turns.

4. The multi-level power converter of claim 1 wherein each switching circuit includes a first switch and a second switch.

5. The multi-level power converter of claim 4 wherein each switching circuit is configured to couple its output to the input voltage when its first switch is on and its second switch is off.

6. The multi-level power converter of claim 5 wherein each switching circuit is configured to couple its output to the reference voltage when its first switch is off and its second switch is on.

7. The multi-level power converter of claim 1 wherein a magnitude of the output voltage is a function of how many of the switching circuits have their respective outputs coupled to the input voltage at a given time.

8. The multi-level power converter of claim 1 wherein the PMA is configured to cause currents provided by the switching circuits to be about equal.

9. The multi-level power converter of claim 1 wherein the power converter does not include an output capacitor.

10. The multi-level power converter of claim 1 further comprising a controller configured for selectively operating the switching circuits to control the variable output voltage.

11. The multi-level power converter of claim 1 wherein the reference voltage is about zero volts.

12. The multi-level power converter of claim 1 further comprising an additional switching circuit, the additional switching circuit connected to an additional input voltage, the additional switching circuit including an output, the additional switching circuit selectively operable to couple its output to the additional input voltage or the reference voltage, the output of the additional switching circuit coupled to the beginning of one of the plurality of windings, and the end of said winding connected to the converter output.

13. A multi-level power converter comprising:
    an input for receiving an input voltage, the input including a first input node and a second input node;
    an output for providing a variable output voltage;
    a parallel magnetic component including a magnetic core, a first winding, a second winding and a third winding, the magnetic core including a first column, a second column, and a third column, the first, second and third columns magnetically connected to each other, the first winding positioned around the first column, the second winding positioned around the second column and the third winding positioned around the third column, each of the first, second, and third windings including an input end and an output end, the first, second and third windings wound in a same direction with respect to their input ends, and the output end of each of the first, second, and third windings are galvanically connected together;
    a first switching circuit coupled to the first input node, the second input node and the input end of the first winding;
    a second switching circuit coupled to the first input node, the second input node and the input end of the second winding; and
    a third switching circuit coupled to the first input node, the second input node and the input end of the third winding.

14. The multi-level power converter of claim 13 wherein each of the first, second and third switching circuits is operable to selectively couple its output to the first input node and the second input node.

15. The multi-level power converter of claim 14 wherein the first, second and third windings all have a same number of turns.

16. The multi-level power converter of claim 14 wherein each of the first, second and third switching circuits includes a first switch and a second switch and each of the first, second and third switching circuits is configured to couple its output to the first input node when its first switch is on and to couple its output to the second input node when its second switch is on.

17. The multi-level power converter of claim 13 wherein the parallel magnetic component is configured to cause currents provided by the first, second and third switching circuits to be about equal.

18. The multi-level power converter of claim 13 wherein the multi-level power supply does not include an output capacitor.

19. The multi-level power converter of claim 13 further comprising a controller configured for selectively operating the first, second and third switching circuits to control the variable output voltage.

20. The multi-level power converter of claim 13 further comprising a third input node for receiving an additional input voltage and a fourth switching circuit coupled to the third input node and the second input node, and wherein the magnetic core includes a fourth column and a fourth winding, the fourth column is magnetically connected to the first, second, and third columns, the fourth winding is positioned around the fourth column, the fourth winding includes an input end and an output end, the fourth winding is wound in the same direction as the first, second and third windings, the output end of the fourth windings is galvanically connected to the output end of the first, second, and third windings, and the input end of the fourth winding is connected to the fourth switching circuit.

21. The multi-level power converter of claim 1 wherein the plurality of switching circuits includes at least a first switching circuit, a second switching circuit, and a third switching circuit, and wherein the plurality of windings includes at least a first winding, a second winding, and a third winding.

\* \* \* \* \*

UNITED STATES PATENT AND TRADEMARK OFFICE
CERTIFICATE OF CORRECTION

PATENT NO. : 8,885,371 B2  
APPLICATION NO. : 13/093415  
DATED : November 11, 2014  
INVENTOR(S) : Markowski et al.

It is certified that error appears in the above-identified patent and that said Letters Patent is hereby corrected as shown below:

In the Specification,

In column 7, line 48, replace "$V_1$" with "$V_{in}$".

Signed and Sealed this  
Fourteenth Day of April, 2015

Michelle K. Lee  
*Director of the United States Patent and Trademark Office*